United States Patent
Hobohm

(10) Patent No.: US 8,931,981 B2
(45) Date of Patent: Jan. 13, 2015

(54) PULL REAMER

(75) Inventor: Uwe Hobohm, Wendelstein (DE)

(73) Assignee: Kennametal Inc., Latrobe, PA (US)

( * ) Notice: Subject to any disclaimer, the term of this patent is extended or adjusted under 35 U.S.C. 154(b) by 994 days.

(21) Appl. No.: 12/991,217

(22) PCT Filed: Feb. 24, 2009

(86) PCT No.: PCT/EP2009/001278
§ 371 (c)(1),
(2), (4) Date: Jan. 20, 2011

(87) PCT Pub. No.: WO2009/138144
PCT Pub. Date: Nov. 19, 2009

(65) Prior Publication Data
US 2011/0103908 A1    May 5, 2011

(30) Foreign Application Priority Data

May 15, 2008   (DE) .......................... 10 2008 023 814

(51) Int. Cl.
*B23D 37/04*   (2006.01)
*B23D 77/12*   (2006.01)
*B23D 77/00*   (2006.01)

(52) U.S. Cl.
CPC ............... *B23D 77/12* (2013.01); *B23D 77/00* (2013.01); *B23D 2277/105* (2013.01); *B23D 2277/205* (2013.01); *B23D 2277/2428* (2013.01); *B23D 2277/2464* (2013.01)
USPC .............. 408/227; 408/144; 408/224; 407/19

(58) Field of Classification Search
USPC ......... 408/144, 224, 229, 227, 223, 225, 226; 407/12, 16, 18, 19
See application file for complete search history.

(56) References Cited

U.S. PATENT DOCUMENTS

| | | | |
|---|---|---|---|
| 595,346 A | | 12/1897 | Saacke |
| 2,643,443 A | * | 6/1953 | Lapointe et al. ................ 407/18 |
| 3,182,531 A | * | 5/1965 | Moore et al. .................. 408/229 |
| 4,231,693 A | | 11/1980 | Kammeraad |
| 4,498,361 A | * | 2/1985 | Grace ......................... 76/101.1 |
| 5,486,075 A | * | 1/1996 | Nakamura et al. ............ 408/230 |
| 5,503,506 A | * | 4/1996 | Yuan .............................. 407/13 |

(Continued)

FOREIGN PATENT DOCUMENTS

| | | |
|---|---|---|
| CH | 364163 | 8/1962 |
| DE | 374340 C | 4/1923 |

(Continued)

OTHER PUBLICATIONS

German International Preliminary Report on Patentability and English Language Translation Thereof, International Application No. PCT/EP2009/003532, 17 pages total.

*Primary Examiner* — Eric A Gates
*Assistant Examiner* — Paul M Janeski
(74) *Attorney, Agent, or Firm* — Larry R. Meenan, Esq.

(57) ABSTRACT

In order to allow high-precision machining of the inner surface of a pipe using little machining time, the draw broach has a cutting part having a plurality of cutters extending in the axial draw direction. The cutting part is divided into a main part and an insertion part tapering conically in the draw direction. The insertion part in turn is divided into a front region, viewed in the draw direction, forming a pre-cutting stage, and a rear region, wherein the conicity of the pre-cutting stage is less than that of the rear region.

14 Claims, 2 Drawing Sheets

(56) References Cited

U.S. PATENT DOCUMENTS

| | | | |
|---|---|---|---|
| 5,827,018 A | 10/1998 | Blankenship et al. | |
| 5,921,728 A * | 7/1999 | Kammeraad et al. | 408/227 |
| 5,967,712 A * | 10/1999 | Magill et al. | 408/227 |
| 6,379,090 B1 | 4/2002 | Halley et al. | |
| 6,918,716 B2 * | 7/2005 | Berktold et al. | 407/18 |
| 7,465,134 B2 * | 12/2008 | Schlotter | 409/259 |
| 8,602,698 B2 * | 12/2013 | Craig et al. | 409/132 |
| 2002/0102141 A1 * | 8/2002 | Meece et al. | 408/1 R |

FOREIGN PATENT DOCUMENTS

| | | |
|---|---|---|
| DE | 560567 | 10/1932 |
| DE | 921 125 | 12/1954 |
| EP | 0121634 A1 | 10/1984 |
| EP | 0 195 838 B1 | 12/1989 |
| EP | 0 937 528 B1 | 5/2001 |
| EP | 1 317 985 A1 | 6/2003 |
| GB | 104 855 | 3/1917 |
| JP | 58137521 A | 8/1983 |

* cited by examiner

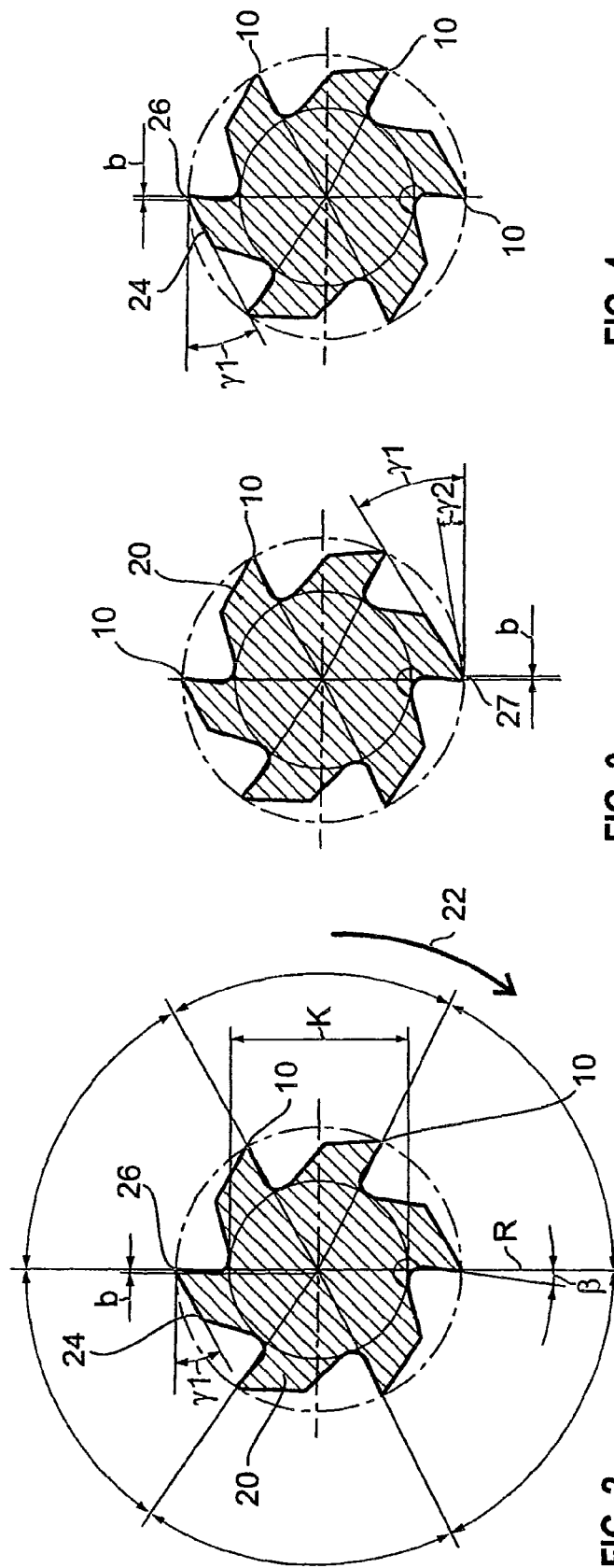
FIG. 2
FIG. 3
FIG. 4
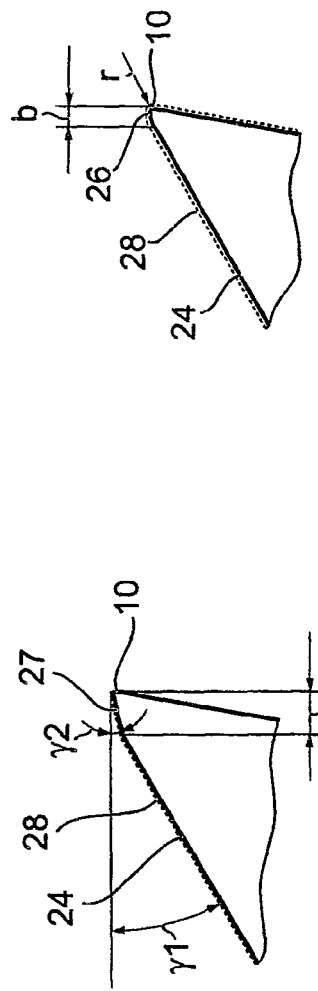
FIG. 5A
FIG. 5B

PULL REAMER

BACKGROUND OF THE INVENTION (1) Field of the Invention

The invention relates to a pull reamer for machining the inner surface of a tube.

(2) Description of the Prior Art

"Pull reamers" are normally used in the high-precision machining of the inner surface of elongated tubes. Pull reamers are reamers which are pulled through the tube during the fine machining for producing a high surface quality. On account of this special operation, the clamping region with which the pull reamer is clamped in place in a machine tool is at a quite considerable distance from a blade part, depending on the respective application. Such pull reamers are used, for example, in the machining of the inner surface of rifle barrels which have a length of up to about 50 cm. On account of the requirements for surface quality and on account of the special operation, high demands are made on the pull reamer. In addition, the machining of elongated tubes is very time-consuming with conventional pull reamers.

The object of the invention is to specify a pull reamer for the fine machining of the inner surface of a tube, said pull reamer permitting a short machining time.

SUMMARY OF THE INVENTION

The object is achieved according to the invention by a pull reamer which has a blade part having a plurality of blades extending in the axial pull direction. The blade part is subdivided into a main part and an entry part tapering conically in the pull direction. The entry part forms a roughing stage on a front region as viewed in the pull direction. In this case, the roughing stage has smaller conicity than an adjoining rear region of the entry part.

The small conicity of the roughing stage achieves the special advantage that an improved cutting-in behavior and in particular also a lower load on the pull reamer are achieved. Due to the improved cutting-in behavior, the pull reamer on the whole can be pulled at a higher cutting speed and with a greater feed through the tube to be machined, such that the requisite machining time is markedly reduced compared with a pull reamer without such a roughing stage. In addition, on account of the lower load, a longer service life, that is to say increased durability of the pull reamer, is achieved. Tests have shown that, using a pull reamer with such a roughing stage, compared with a pull reamer without a roughing stage, the requisite machining time can be reduced by a factor of 5 to 8.

In this case, the roughing stage preferably has markedly smaller conicity, which is lower than that of the rear region of the entry part at least by a factor of 10, preferably by a factor of about 50. With such a roughing stage, it is possible to immediately start the machining at the full cutting speed right at the beginning of the machining operation. During the machining, the procedure is normally such that the pull reamer is applied to the tube with the roughing stage in front in the pull direction and is inserted slightly into the tube. The pull reamer and/or the tube is then set in rotation and the pull reamer is pulled through the tube in the longitudinal direction thereof. In the configuration with the roughing stage, the full rotary speed and the desired feed are therefore immediately set, with which the entire machining of the tube is then effected. In contrast thereto, first of all starting phases are provided in the case of conventional pull reamers, during which starting phases a lower rotary speed and a lower feed are set.

The roughing stage is formed overall with only very small conicity and is thus of virtually cylindrical design. Overall, the entry part is of multi-stage design and is preferably of only two-stage design with the virtually cylindrical roughing stage and the rear conical region with uniform conicity.

In this case, the roughing stage preferably has conicity with a cone angle within the region of less than about 0.03°. Here, the cone angle is preferably merely within the region of a few thousands of a degree, for example within the region of 0.005°. The roughing stage therefore has an extremely small taper and is in this sense virtually cylindrical. The taper in this case is <0.05 mm per 100 mm of axial length. In particular, the taper is preferably within the region of 0.01 mm per 100 mm of axial length.

In contrast, the rear region of the entry part has comparatively large conicity, which preferably has a cone angle within the range of about 0.1° to 0.8° and in particular within the region of about 0.3°.

According to a preferred development, the blade part has its maximum diameter, the calibrating diameter, at the transition from the entry part to the main part. Starting from this transition region, the main part tapers against the pull direction. The main part is therefore also designed to be conical, but in the opposite direction to the entry part. The conicity of the main part is preferably constant over its entire length and corresponds in particular approximately to the conicity of the roughing stage. The conicity of the main part prevents the machined inner surface from being damaged by the rear part of the pull reamer during the cutting operation, for example on account of heat-induced expansions.

The main part and the entry part preferably have lengths in the ratio of about 60:40. The length ratio extends, for example, over a range of 50:50 to 70:30, i.e., at an overall length of the blade part, at a ratio of 60:40, 60% of the overall length is allotted to the main part and 40% is allotted to the entry part. Furthermore, provision is expediently made for the rear region and the roughing stage of the entry part to have lengths in the ratio of about 2/3:1/3. With respect to the overall length of the entry part, the rear region therefore takes up about 2/3 of the overall length and the roughing stage takes up about 1/3 of the overall length of the entry part. The relationship between the rear region and the roughing stage can in this case vary between a length ratio of 75:25 to 50:50. These length ratios have proved to be especially advantageous with regard to a high working speed and a high stability. In addition, the length of the substantially cylindrical roughing stage has a very advantageous effect overall on the concentric running behavior of the pull reamer. Due to the substantially cylindrical configuration of the roughing stage, the pull reamer is guided in a centred manner virtually by the tube itself. The high working speeds can be achieved not least on account of this guidance function of the roughing stage. On the whole, on account of the improved concentric running behavior, the load on the pull reamer is also reduced and the service life increased.

In an expedient configuration, in order to ensure that cutting-in is as smooth as possible, the blades have a cylindrically ground chamfer in the region of the roughing stage.

Furthermore, in order to assist smooth cutting-in, the blades preferably have edge rounding in the region of the roughing stage. Such edge rounding is produced, for example, by brushing or blasting the originally sharply ground blades. In this case, rounding with a radius within the μm range is formed.

In contrast, the blades are preferably designed to be sharp-edged, that is to say without rounding, in the rear region of the entry part. This sharp-edged configuration permits defined and high-precision machining of the surface, such that a good surface quality is achieved. The sharp-edged configuration is promoted by incorporating the roughing stage in front. A chamfer (clearance) surface preferably adjoins the blade in the circumferential direction and encloses a chamfer clearance angle of preferably >10° with respect to the circumferential direction. As viewed in the circumferential direction, the chamfer has a width of preferably at most a few tenths of a millimeter. The width of the chamfer is, for example, only 0.1 mm.

As in the roughing stage, the blades in the main part adjoining the rear region of the entry part are in turn preferably provided with a cylindrically ground chamfer and with edge rounding.

Both the edge rounding and the cylindrically ground chamfer serve in a special manner to keep down the load for the blades in the region of the roughing stage and at the same time serve to make rough cutting possible. In interplay with the sharp-edged blades in the rear region, an optimum working pitch is thereby achieved between the roughing stage and the rear region of the entry part. This is because the main cutting work is performed on the whole by the entry part since the maximum diameter of the pull reamer, the calibrating diameter, is achieved in the transition region between the entry part and the main part.

The pull reamer preferably has more than four blades and in particular, for example, six blades. Due to the comparatively large number of blades, the load on the individual blade is reduced, and so the service life overall is increased as a result.

Furthermore, with regard to as good a concentric running behavior as possible, the blades preferably have an unequal pitch, i.e. the individual blades are not equally distributed around the circumference but rather are at different angular distances from one another.

In order to make possible as long a service life as possible with the pull reamer, said pull reamer is expediently formed from solid carbide. In contrast to HSS for example, solid carbide has markedly higher wear resistance. The greater brittleness of the solid carbide is not a problem in this case on account of the roughing stage and the cutting behavior improved as a result. In an especially advantageous manner, therefore, the roughing stage favors the use of solid carbide in order to increase the service life compared with an HSS material. As an alternative to carbide, a ceramic material or a "cermet" material, that is to say a composite consisting of a ceramic material in a metal matrix, can also be used.

Furthermore, the service life is preferably increased by applying a thin coating. The expression "thin coating" refers in this case to a coating having a layer thickness within the region of a few micrometers, for example within the range of 0.5 µm to 0.8 µm. Such coatings are deposited on the solid carbide body, for example, by means of the PVD process (physical vapor deposition). Suitable coating materials known per se are used here for the coating. In this case, the thin coating is preferably finally applied after the grinding, brushing/rounding and the making of the cutting chamfers.

In order to make possible simple regrinding of the blades, provision is made in an expedient development for conical or frustoconical center points to be formed on both ends of the pull reamer. These center points permit simple axially parallel centering of the pull reamer in a corresponding holder for a regrinding operation.

BRIEF DESCRIPTION OF THE DRAWINGS

An exemplary embodiment of the invention is explained in more detail below with reference to the figures. In the drawing, in each case in exemplary illustrations:

FIG. 2 shows a sectional view in the region of section line A-A in the region of the main part of the blade region, FIG. 3 shows a sectional view along section line B-B in the rear region of the entry part of the blade region, FIG. 4 shows a sectional view along section line D-D in the region of the roughing stage, and FIGS. 5A, 5B show highly simplified illustrations of the blade geometry in the main part and in the roughing stage (FIG. 5A) and in the rear region (FIG. 5B).

DETAILED DESCRIPTION OF THE INVENTION

Figure 1:
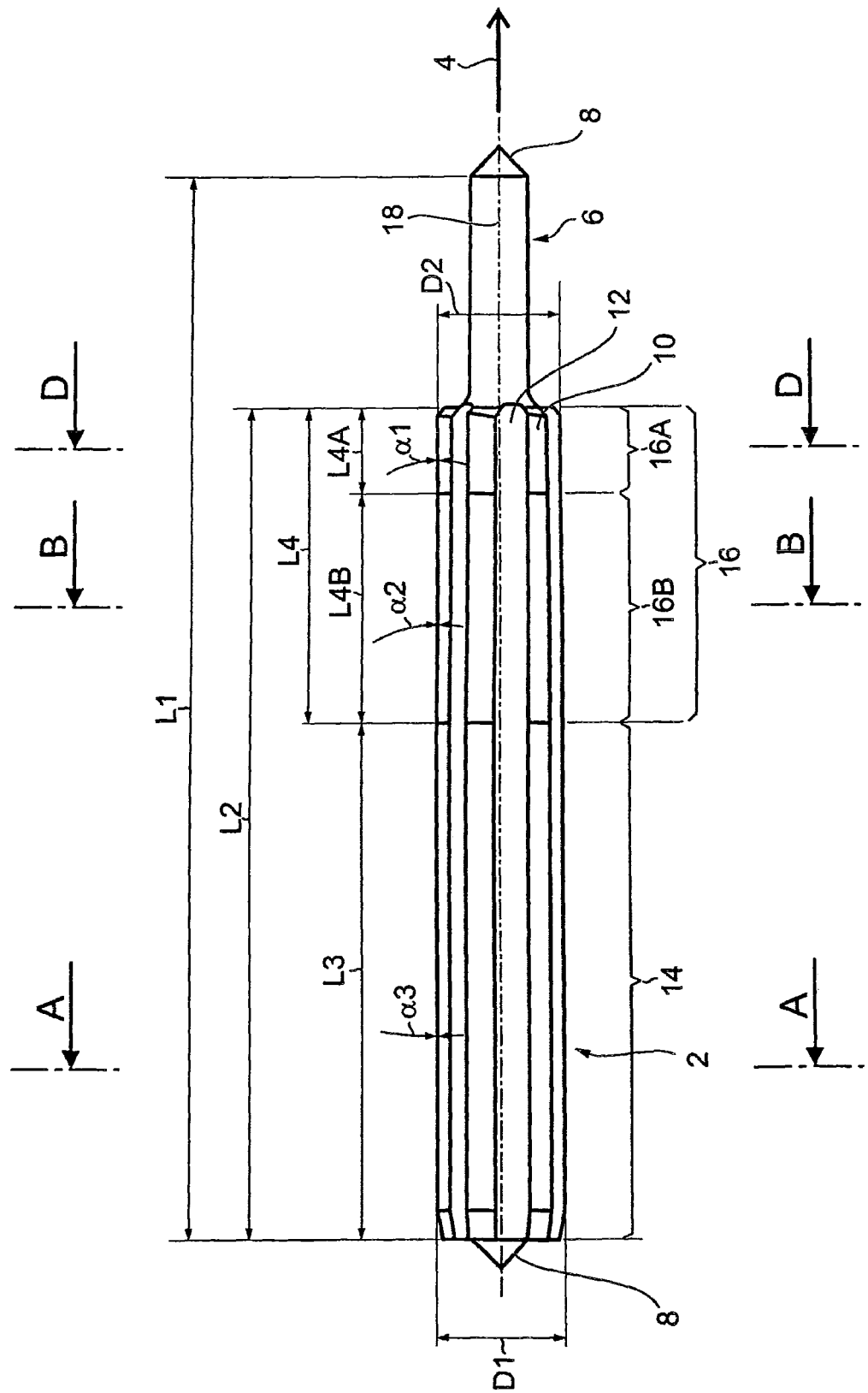
FIG. 1 shows a side view of a pull reamer.

Parts having the same effect are provided with the same reference numerals in the figures.

The pull reamer shown in FIG. 1 comprises a blade part 2, adjoining which in the axial pull direction 4 is a shank part 6. A center point 8 is arranged on both sides on opposite ends of the pull reamer, said center points 8 being conical in the exemplary embodiment.

In the blade part 2, a plurality of blades 10 which extend in the axial direction are unequally distributed over the circumference. In the exemplary embodiment, a total of six blades are provided. A flute 12 is provided in each case between the individual blades. In the exemplary embodiment, the blades 10 and the flutes 12 run parallel to the axis. In principle, it is also possible for the blades 10 and the flutes 10, 12 to run helically.

The pull reamer serves to machine the inner surface of a tube in order to achieve a high surface quality. To this end, the pull reamer is inserted into an end side of the tube with the shank part 6 in front and is then pulled through the tube in the pull direction 4. In the process, the machining is effected with a predetermined rotary speed and a predetermined feed in the pull direction 4. The pull reamer serves, for example, to machine a tube having a length of about 50 cm and an inside diameter, for example, within the range of 6 to 12 mm. The pull reamer has an overall length L1 within the region of, for example, 80 mm. The overall length L1 in this case is measured from an end of the blade part 2 up to the opposite end of the shank part, without the center points 8.

Of particular importance in the pull reamer is the subdivision of the blade part 2 into different sections, namely a longer main part 14 and a shorter conical entry part 16. The entry part 16 in turn is subdivided into a front region in the pull direction, which forms a roughing stage 16A, and into a rear region 16B. The rear region 16B is directly adjacent to the roughing stage 16A and forms an uninterrupted connection therewith.

The blade part 2 has an overall length L2 which corresponds approximately to of the overall length L1 and is around 60 mm in the exemplary embodiment. The main part 14 in turn has a length L3 of about 60% of the overall length L2 of the blade part 2 and is therefore about 35 mm in the exemplary embodiment. Accordingly, the entry part 16 has a length L4 within the region of preferably about 40% of the overall length L2 of the blade part 2. The ratio of the lengths L3 to L4, which in the exemplary embodiment is about 60/40, can also, as a departure therefrom, vary between the ratio values 50/50 and 70/30.

The length L4 of the entry part 16 is in turn divided into a length L4A of the roughing stage 16A and a length L4B of the rear region 16B. In the exemplary embodiment, the ratio of the lengths L4A to L4B is within the range of ⅓ to ⅔ and varies, for example, within the range of ¼ to ¾ up to an equal division of the two lengths L4A, L4B.

Of particular importance for the cutting properties of the pull reamer described is the arrangement and the special configuration of the roughing stage 16A, in particular also in combination with the arrangement and the special configuration of the rear region 16B. Both the roughing stage 16A and the rear region 16B are of conical design and therefore taper in the pull direction 4. In this case, the roughing stage 16A has very small conicity and is virtually of cylindrical design. In contrast thereto, the conicity of the rear region 16B is far greater. Here, the expression "conicity" generally refers to an inclination of the blades 10 relative to a center longitudinal axis 18 of the pull reamer. The blades 10 and/or the enveloping surface defined by said blades 10 and forming a lateral surface of a truncated cone are/is oriented relative to this center axis 18 at an angle designated as cone angle. The roughing stage 16A is in this case inclined relative to the center axis 18 at a cone angle $\alpha 1$ and the rear region is inclined relative to the center axis 18 at a cone angle $\alpha 2$. Whereas the cone angle $\alpha 2$ of the rear region 16B is approximately within the region of 0.3°, the cone angle $\alpha 1$ of the roughing stage 16A is only about 0.006°. The roughing stage 16A therefore has approximately a taper of 0.01 mm per 100 mm and is therefore in this sense of substantially cylindrical design. The expression "substantially or virtually cylindrical" therefore means a taper in the region of one tenth of a part per thousand.

The main part 14 also has conicity, but in the opposite direction; i.e. the main part 14, starting from a transition region to the entry part 16, tapers appreciably toward the end remote from the shank part 6. The taper angle $\alpha 3$ is approximately within the range of the taper angle $\alpha 1$. The course, i.e. the inclination of the blades 10 at the transition to the main part 14, generally changes, for example, at a bend point.

Overall, therefore, the pull reamer has its maximum diameter, the "calibrating diameter" D1, in the transition region between entry part 16 and main part 14. It is, for example, around 7.6 mm or alternatively 8.7 mm. In principle, different values can of course also be provided depending on the respective application. Starting from this calibrating diameter D1, the entry part 16 tapers toward the front end of the roughing stage 16A to an entry diameter D2, which, at the lengths and conicity selected and at the calibrating diameter D1 specified, is around 7.35 mm or 8.55 mm, respectively, in the exemplary embodiment.

The entry diameter D2 is in this case dimensioned in such a way that the pull reamer, with the roughing stage 16A in front, can be inserted by a short distance into the tube to be machined. In order to facilitate this, a conical entry chamfer is provided at the end face and has a cone angle within the double-digit degree range, for example 45°. During the machining operation, the procedure is such that first of all the pull reamer, with the roughing stage 16A in front, is inserted slightly into the tube and that the actual cutting operation then begins, during which the pull reamer and the tube are set in motion relative to one another, namely a superimposed rotary and axial movement. To this end, either the pull reamer or the tube is set in rotary motion at a predetermined rotational speed. At the same time, the pull reamer is pulled through the tube in the pull direction 4. On account of the arrangement of the roughing stage 16A and the special configuration to be explained in more detail below, it is possible to run up to the final cutting speed right at the start of the cutting operation. A slow cutting-in operation is therefore unnecessary. Due to its substantially cylindrical configuration, the roughing stage 16A has a centering function and thus a guidance function, such that good concentric running properties are achieved overall, which is of considerable importance for a high surface quality of the inner lateral surface, to be machined, of the tube. A coolant and a lubricant are normally supplied during the machining. To this end, either coolant bores can be provided in the pull reamer itself or the coolant can also be supplied through the tube itself.

Furthermore, for the desired high cutting capacity with at the same time as long a service life as possible, a special configuration of the blades 10 is of particular importance.

The blade geometry in the different regions of the reamer is explained in more detail in connection with FIGS. 2 to 4. First of all the unequal pitch of the blades 10 can be seen very clearly from FIG. 2, said blades 10 therefore being unequally distributed over the circumference, such that blades adjacent to one another are in each case at a different angular distance from one another. In the exemplary embodiment having the six blades, the angular distance between two blades varies by between about 55 and 65°, that is to say by 10% relative to an equal distribution. Also depicted in FIG. 2 is the "core diameter" K, which in the exemplary embodiment is around 60% of the calibrating diameter D1.

Furthermore, the basic configuration of the flutes and of the cutting webs 20 can be seen from the cross-sectional illustrations of FIGS. 2 to 4. Here, the expression "cutting webs" 20 refers to the webs which are formed between the flutes 12 and which have the blades 10 on their front edge in the direction of rotation 22. The cutting webs 20 generally have a roughly trapezoidal cross-sectional contour. The flutes themselves have roughly a V-shaped cross-sectional geometry, the flute root being rounded. The front flank of the cutting webs 20, which runs to the respective blade 10, is inclined in the direction of rotation 22 by a lead angle $\beta$ in the region of about 10° relative to a radial line R. A flank 24 adjoins the blades 10, in each case on the back of the cutting web 20, against the direction of rotation 22, said flank 24 being inclined at a flank angle $\gamma 1$, which in the exemplary embodiment is within the double-digit range, in particular around 35°. The flank angle $\gamma 1$ is determined by the angle between a tangent to the cutting edge of the blade 10 and the flank 24.

The blades 10 have a cylindrically ground chamfer 26, that is to say a chamfer having a curved chamfer surface, both in the region of the main part 14 and in the region of the roughing stage 16A. The cylindrically ground chamfer 26 has a chamfer width b within the region of only a few tenths of a millimeter. Furthermore, provision is made for the cutting edge of the blade 10 to be of rounded design, a very small radius r, for example within the μm range, being set here. In contrast thereto, the cutting edges of the blades 10 in the rear region 16B (FIG. 3) are designed to be sharp-edged and without rounding. At the same time, a chamfer 27 inclined at a chamfer clearance angle $\gamma 2$ is provided in this region, the flank 24 then adjoining said chamfer 27 at the clearance angle $\gamma 1$. The chamfer 27 likewise has a chamfer width b within the range of only a few tenths of a millimeter.

The different cutting geometries are reproduced once again schematically in FIGS. 5A, 5B, FIG. 5A schematically sketching the configuration in the rear region 16B and FIG. 5B schematically sketching the configuration in the region of the main part 14 and of the roughing stage 16A. A thin coating 28 is also additionally indicated in FIGS. 5A, 5B.

During the production process, the procedure is such that first of all the flutes 12 are ground into a cylindrical solid body, consisting preferably of carbide, and the cutting webs 20 and the blades 10 are ground accordingly. In the process, a sharp-edged configuration of the blades 10, as is desired later in the rear region 16B, is first of all formed over the entire length of blade part 2. The cylindrically ground chamfers 26 are then ground in the main part 14 and in the roughing stage 16A, and the edge rounding of the cutting edges is formed by, for example, brushing or blasting. Finally, in the last production step, the thin coating 28 consisting of a suitable wearresistant material is applied, in particular by means of the PVD process, with a layer thickness within the range of between 0.5 and 0.8 μm.

An especially durable pull reamer is formed overall by the combination of the individual features described here, said pull reamer being suitable at high cutting speeds for the high-precision machining of the inner surface of a tube and at the same time attaining a very long service life. The concentric running is favorably influenced by the substantially cylindrical configuration of the roughing stage 16A. This is assisted by the special configuration of the blades in the roughing stage 16A with the cutting chamfer 26, in particular in combination with the edge rounding. As a result, comparatively smooth engagement in the workpiece in the region of the roughing stage 16A is achieved, and therefore the loads in this region are kept low. In contrast, efficient and speedy machining of the surface to the calibrating diameter D1 is achieved by the markedly greater conicity in the rear region 16B and the sharp-edged configuration of the blades 10. In this case, despite the sharp-edged configuration of the blades 10, the load is kept low on account of the preceding roughing stage 16A.

The invention claimed is:

1. A pull reamer for machining the inner surface of a tube, comprising a cylindrical shank part having a diameter adapted to receive a pulling tool and a blade part having a plurality of blades extending in an axial pull direction, wherein the blade part has diameters greater than the shank part and wherein the axial pull direction is the direction in which the pull reamer is pulled through the tube, wherein the blade part is subdivided into a main part and an entry part, wherein the entry part tapers conically in the axial pull direction, wherein the entry part forms a roughing stage on a front region as viewed in the axial pull direction and a rear region is directly adjacent thereto and forms an uninterrupted connection therewith, said roughing stage having smaller conicity than a rear region of the entry part, wherein the roughing stage is virtually cylindrical.

2. The pull reamer as claimed in claim 1, wherein the roughing stage has conicity with a cone angle within the region of less than about 0.03°.

3. The pull reamer as claimed in claim 1, wherein the rear region of the entry part has conicity with a cone angle within the range of about 0.1° to 0.8°.

4. The pull reamer as claimed in claim 1, wherein the blade part has a maximum diameter at the transition from the entry part to the main part.

5. The pull reamer as claimed in claim 1, wherein the main part and the entry part have lengths in the ratio of about 60/40.

6. The pull reamer as claimed in claim 1, wherein the rear region and the roughing stage of the entry part have lengths in the ratio of about ⅔ to ⅓.

7. The pull reamer as claimed in claim 1, wherein the blades have a cylindrically ground chamfer in the region of the roughing stage.

8. The pull reamer as claimed in claim 1, wherein the blades have rounded edges in the region of the roughing stage.

9. The pull reamer as claimed in claim 1, wherein the blades include sharp edges in the rear region.

10. The pull reamer as claimed in claim 1, wherein more than four blades are provided.

11. The pull reamer as claimed in claim 1, wherein the blades have an unequal pitch.

12. The pull reamer as claimed in claim 1, wherein the reamer is formed from a solid carbide.

13. The pull reamer as claimed in claim 1, wherein the reamer is provided with a thin coating.

14. The pull reamer as claimed in claim 1, wherein the pull reamer has two opposing ends, wherein a center point is included at each end.

* * * * *